United States Patent
Yoshinari et al.

[11] Patent Number: 5,978,349
[45] Date of Patent: Nov. 2, 1999

[54] OPTICAL RECORDING MEDIUM

[75] Inventors: Jiro Yoshinari; Hiroyasu Inoue; Tatsuya Kato, all of Nagano, Japan

[73] Assignee: TDK Corporation, Tokyo, Japan

[21] Appl. No.: 09/129,386

[22] Filed: Aug. 5, 1998

[30] Foreign Application Priority Data

Aug. 21, 1997 [JP] Japan .................................. 9-240514

[51] Int. Cl.$^6$ ...................................................... G11B 7/24
[52] U.S. Cl. .................................. 369/275.1; 430/270.13; 428/64.4
[58] Field of Search ...................... 369/275.1, 275.2, 369/288, 274; 430/270.13; 428/64.1, 64.4

[56] References Cited

U.S. PATENT DOCUMENTS

| | | | |
|---|---|---|---|
| 4,839,883 | 6/1989 | Nagata et al. | 369/286 |
| 5,249,175 | 9/1993 | Akahira et al. | 369/275.1 |
| 5,410,534 | 4/1995 | Nagata etal. | 369/275.4 |
| 5,493,561 | 2/1996 | Nishiuchi et al. | 369/275.1 |
| 5,545,454 | 8/1996 | Yamada et al. | 428/64.1 |
| 5,650,992 | 7/1997 | Ohkubo | 369/275.1 |
| 5,652,036 | 7/1997 | Kobayashi | 428/64.1 |
| 5,882,758 | 3/1999 | Terada et al. | 428/64.1 |

FOREIGN PATENT DOCUMENTS

| | | |
|---|---|---|
| 2-177141 | 7/1990 | Japan . |
| 8-124218 | 5/1996 | Japan . |
| 63-103453 | 5/1998 | Japan . |

Primary Examiner—Tan Dinh
Attorney, Agent, or Firm—Laubscher & Laubscher; R. J. Lasker

[57] ABSTRACT

A phase change optical recording medium having an increased number of overwritable operations is provided. In this medium, the recording layer is disposed between a first dielectric layer and a second dielectric layer which contain zinc sulfide and silicon oxide as their main components; and difference between light absorption coefficient (Ac) of the recording layer in the region other than record marks (in crystalline state) and the light absorption coefficient (Aa) of the recording layer in the record marks (in noncrystalline state) is small, or Ac>Aa. More illustratively, the first dielectric layer is disposed underneath the recording layer and the second dielectric layer is disposed over the recording layer; and the conditions: $Ac/Aa \geq 0.9$ and/or light transmittance $\geq 1\%$ is satisfied. The first dielectric layer comprises a dielectric layer $1a$ on the side of the substrate and a dielectric layer $1b$ on the side of the recording layer; and the dielectric layer $1a$ has a silicon oxide content of from 2 mol % to less than 40 mol %, the dielectric layer $1b$ has a silicon oxide content of from 40 mol % to 80 mol %, and the second dielectric layer has a silicon oxide content of from 40 mol % to 80 mol %; and the second dielectric layer has a thickness of 10 to 35 nm.

8 Claims, 1 Drawing Sheet

OPTICAL RECORDING MEDIUM

BACKGROUND OF THE INVENTION

1. Field of the Invention

This invention relates to a phase change optical recording medium.

2. Prior Art

Highlight is recently focused on optical recording media capable of recording information at a high density and erasing the recorded information for overwriting. One typical rewritable (or erasable) optical recording medium is of the phase change type wherein a laser beam is directed to the recording layer to change its crystalline state whereupon a change of reflectance by the crystallographic change is detected for reproduction of the information. The phase change optical recording media are of great interest since the drive unit used for their operation is simple as compared with magneto-optical recording media.

Most optical recording media of phase change type used chalcogenide systems such as Ge—Sb—Te systems which provide a substantial difference in reflectance between crystalline and amorphous states and have a relatively stable amorphous state.

When information is recorded in the optical recording medium of phase change type, the laser beam applied is of high power (recording power) that the recording layer is heated to a temperature higher than the melting point. In the region where the recording power is applied, the recording layer is melted and thereafter quenched to form an amorphous record mark. When the record mark is erased, a laser beam of relatively low power (erasing power) is applied so that the recording layer is heated to a temperature higher than the crystallizing temperature and lower than the melting temperature. The record mark to which the laser beam of erasing power is applied is heated to a temperature higher than the crystallizing temperature and then allowed to slowly cool to recover the crystalline state. Accordingly, in the optical recording media of the phase change type, the medium can be overwritten by modulating the intensity of a single light beam.

In the optical recording medium of phase change type, dielectric layers are generally formed on opposite sides of the recording layer. Requirements for the dielectric layers are:

(1) the dielectric layers should be capable of protecting the recording layer and the substrate from heat histerisis as a result of the laser beam irradiation;

(2) the dielectric layers should be capable of amplifying the reproduced signal by making use of optical interference effect of lights reflected from boundaries between the layers; and (3) the recording and erasing properties can be regulated by adjusting thermal conductivity and the like of each dielectric layer.

Typical dielectric layers which meet such requirements are those containing highly refractive ZnS as their main component. For example, Japanese Patent Application Kokai (JP-A) No. 103453/1988 discloses an optical information recording material having a dielectric layer containing a mixture of ZnS and $SiO_2$. The merits described therein include increase in sensitivity for the power of incident light upon recording, and increase in the number of erasing/overwriting operations of the dielectric material. The increase in the sensitivity is said to have been realized by optimizing thermal constant of the dielectric layer, and the increase in the number of erasing/overwriting operations is said to have been realized by preventing the alteration in the nature of the dielectric layer. JP-A 103453/1988 discloses that $SiO_2/(ZnS+SiO_2)$ is preferably in the range of 10 to 30 mol % since the laser energy required for the recording and the erasure is minimum when $SiO_2/(ZnS+SiO_2)$ is in such range.

However, in the optical recording medium of phase change type wherein the recording layer comprising Ge—Sb—Te based material or the like is sandwiched by dielectric layers containing ZnS as their main component, C/N reduces with the repeated overwriting operations, and the medium becomes unoverwritable after approximately several thousand times. A major cause for the decrease in C/N with the repeated overwriting operations is believed to be influence of the alteration in the composition of the recording layer due to element diffusion between the adjacent dielectric layer.

JP-A 177141/1990 describes an optical information recording medium wherein reaction between the recording layer and the dielectric layers is suppressed. This optical information recording medium has a recording layer which absorbs light in the recording and erasure of the information, and a protective layer formed on at least one side of the recording layer, and the protective layer contains as its main components a metal chalcogenide and a compound which does not form a solid solution with the chalcogenide. This protective layer is formed such that the compositional ratio alters in the direction of the film thickness, and the part in the vicinity of the interface with the recording layer has a larger content of said compound. ZnS is the exemplary compounds disclosed as the chalcogenide and $SiO_2$ is the exemplary compounds disclosed as said compound. JP-A 177141/1990 states that the reaction between the recording layer and the protective layer is prevented by increasing the $SiO_2$ content of the protective layer in the vicinity of the recording layer and the alteration of the recording layer composition is thereby prevented to realize stable recording and erasure for about several million cycles with no substantial alteration in the reflectance. In Example 1 of JP-A 177141/1990, a first dielectric layer (thickness, 100 nm) containing ZnS and 20% of $SiO_2$ is formed on the substrate, and a protective layer (thickness, 20 nm) containing at least 90% of $SiO_2$, a recording layer of Te—Ge—Sb, the protective layer (thickness, 20 nm) as described above, a second dielectric layer (thickness, 200 nm) similar to the first dielectric layer, and a reflective layer of NiCr (thickness, 40 nm) are formed thereon. In Example 2 of JP-A 177141/1990, a protective layer having a composition gradient wherein $SiO_2$ content is as high as 90% or more in the vicinity of the recording layer is formed instead of "the dielectric layer+the protective layer" of Example 1.

The optical recording medium of phase change type utilizes difference in reflectance between the crystalline and the noncrystalline state, and light absorption coefficient (Ac) of the recording layer in the region other than record marks (in crystalline state) and the light absorption coefficient (Aa) of the recording layer in the record marks (in noncrystalline state) are often different, and the Ac<Aa is the condition generally found in such situation. Recording sensitivity and erasability are thus different depending on whether the region overwritten is crystalline or noncrystalline, and consequently, the record marks of different length and width are formed by the overwriting to invite increase in the jitter often resulting in errors. When mark edge recording wherein the information is encoded in opposite edges of the record marks is adopted for increasing the recording density, variation in the length of the record marks has greater significance and such variation invites increased errors. In order to solve such situation, the absorption coefficient should be adjusted such that the difference between Ac and Aa is small, and preferably Ac>Aa in consideration of the latent heat, by regulating the thickness of the recording layer or the dielectric layers sandwiching the recording layer. In the medium of the conventional structure, the adjustment to Ac≧Aa results in reduced difference between the reflectance (Rc) of the medium of the region other than the record marks and the reflectance (Ra) of the medium in the record marks, and hence, in a reduced C/N.

JP-A 124218/1996 proposes an optical information recording medium comprising a substrate, a first dielectric layer, a recording layer, a second dielectric layer, a reflective layer, a third dielectric layer, and a UV curing resin layer disposed in this order wherein Ac>Aa, and an extremely thin metal film of high light transmission, Si or Ge is used for the reflective layer, and a dielectric material having a refractive index of higher than 1.5 is used for the third dielectric layer. The relation Ac>Aa is achieved without detracting from the high (Rc−Ra) by providing the reflective layer of high light transmission and the third dielectric layer of high refractive index. In the present invention, the structure wherein difference between Ac and Aa is small or wherein Ac>Aa is referred to as absorption coefficient control structure.

In the optical recording medium of absorption coefficient control structure, the dielectric layer is also preferably the one containing ZnS and $SiO_2$ as its main components as in the case of the conventional optical recording medium. When the ZnS—$SiO_2$ based dielectric layer is formed in the optical recording medium of absorption coefficient control structure, the medium also suffers from increase in jitter by the repeated overwriting operations as well as decrease in the modulation (difference between the reflectance of the crystalline portion and the reflectance in the non-crystalline portion), and as a consequence, decrease in the number of overwritable operations.

In view of such situation, the inventors of the present invention prepared an optical recording medium of absorption coefficient control structure in accordance with the Example of JP-A 177141/1990, supra. This optical recording medium, however, exhibited marked increase in jitter in the repeated overwriting operations, high jitter from the initial overwriting operations, and no improvement in the modulation decrease.

SUMMARY OF THE INVENTION

In view of the situation as described above, an object of the present invention is to increase the number of overwritable operations in the optical recording medium of phase change type wherein difference between the light absorption coefficient (Ac) of the recording layer in the region other than record marks (in crystalline state) and the light absorption coefficient (Aa) of the recording layer in the record marks (in noncrystalline state) is small or Ac>Aa, and the recording layer is sandwiched between the dielectric layers each containing zinc sulfide and silicon oxide as their main components.

The objects as described above are realized by the optical recording medium and the production method thereof as described below in (1) to (6).

(1) An optical recording medium having a substrate and a recording layer of phase change type wherein the recording layer has a first dielectric layer and a second dielectric layer disposed on opposite sides thereof and in contact therewith, wherein condition I: light absorption coefficient of the recording layer at wavelength of the laser beam used for recording/reproduction is such that:

$Ac/Aa \geq 0.9$ when light absorption coefficient in crystalline region is Ac and light absorption coefficient in noncrystalline region is Aa; and/or condition II: the medium has a light transmittance of at least 1% when the medium is irradiated from its rear side with a laser beam used for recording/reproduction; is fulfilled; and difference in reflectance between the record mark and the erased region after at least 10,000 overwriting operations is at least 85% of the difference in reflectance in initial overwriting operations.

(2) An optical recording medium having a substrate and a recording layer of phase change type wherein the recording layer has a first dielectric layer and a second dielectric layer disposed on opposite sides thereof and in contact therewith, wherein condition I: light absorption coefficient of the recording layer at wavelength of the laser beam used for recording/reproduction is such that:

$Ac/Aa \geq 0.9$ when light absorption coefficient in crystalline region is Ac and light absorption coefficient in noncrystalline region is Aa; and/or condition II: the medium has a light transmittance of at least 1% when the medium is irradiated from its rear side with a laser beam used for recording/reproduction; is fulfilled;

the first dielectric layer and the second dielectric layer contains zinc sulfide and silicon oxide as their main components, and the first dielectric layer comprises a dielectric layer 1a on the side of the substrate and a dielectric layer 1b on the side of the recording layer;

the dielectric layer 1a has a silicon oxide content of from 2 mol % to less than 40 mol % (not including 40 mol %), the dielectric layer 1b has a silicon oxide content of from 40 mol % to 80 mol %, and the second dielectric layer has a silicon oxide content of from 40 mol % to 80 mol % when the silicon oxide content is determined by $SiO_2/(ZnS+SiO_2)$ by calculating the zinc sulfide and the silicon oxide in terms of ZnS and $SiO_2$, respectively; and the second dielectric layer has a thickness of 10 to 35 nm.

(3) The optical recording medium according to the above (2) wherein said dielectric layer 1b has a thickness of 5 to 40 nm, and ratio ($t_{1b}/t_1$) of the thickness of the dielectric layer 1b ($t_{1b}$) to the thickness of the first dielectric layer ($t_1$) is in the range of 0.02 to 0.5.

(4) The optical recording medium according to the above (2) or (3) wherein the optical recording medium is the medium of claim 1.

(5) The optical recording medium according to the above (1) or (2) wherein a reflective layer is disposed on the second dielectric layer, and the reflective layer is the one comprising a metal with a thickness of up to 40 nm or the one comprising Si or Ge with a thickness of up to 80 nm.

(6) The optical recording medium according to the above (5) wherein a third dielectric layer is disposed on the reflective layer.

DETAILED DESCRIPTION OF THE INVENTION

Figure 1:
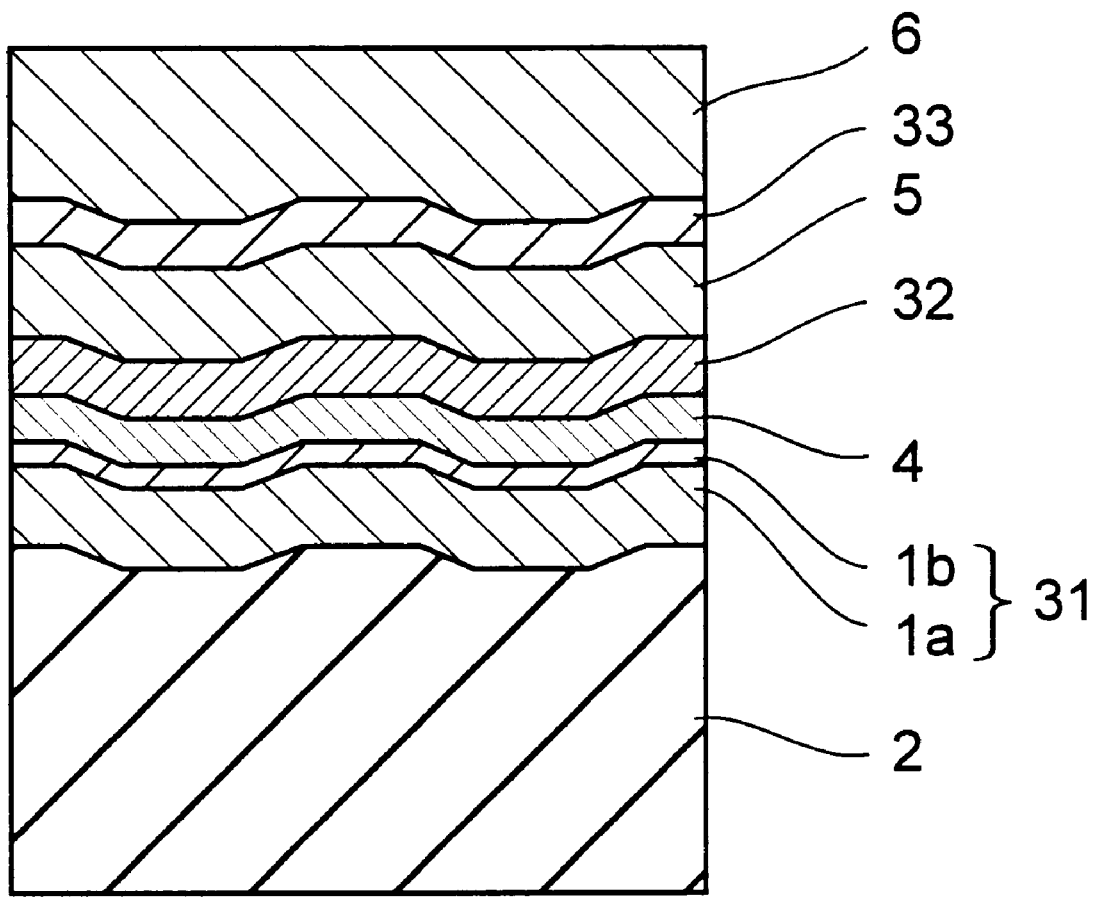
FIG. 1 is a partial cross-sectional view of an embodiment of the optical recording medium according to the present invention.

The optical recording medium of the present invention is the medium of the absorption coefficient control structure, that is, the medium which meets the condition I (Ac/Aa≧0.9) and/or the condition II (a light transmittance of at least 1%) as described above.

As shown in FIG. 1, the optical recording medium of the present invention comprises a substrate 2, and at least a first dielectric layer 31, a recording layer 4 of phase change type, and a dielectric layer 32 disposed on the substrate 2 in this order, and the first dielectric layer 31 and the second dielectric layer 32 contain ZnS and $SiO_2$ as their main components.

The first dielectric layer 31 comprises a dielectric layer 1a on the side of the substrate 2 and a dielectric layer 1b on the side of the recording layer 4. The dielectric layer 1a has a relatively high ZnS content, and the dielectric layer 1b has a relatively high $SiO_2$ content. The second dielectric layer 32 has a $SiO_2$ content which is equivalent to the dielectric layer 1b and a thickness oft up to 35 nm. By constituting the medium of the absorption coefficient control structure as described above, jitter can be reduced from the initial overwriting operations and increase of jitter by repeated overwriting operations can be suppressed, and decrease in the modulation is suppressed to enable increase in the number of overwritable operations.

When the inventors of the present invention prepared a sample of the optical recording medium in accordance with the Example of JP-A 2-177141, supra, jitter was markedly high from initial overwriting operations, and such high jitter is estimated to be due to the thickness of the second dielectric layer as thick as 220 nm. When the second dielectric layer has such thickness, the heat from the laser beam irradiation spot of the recording layer will widely diffuse in the in-plane directions of the second dielectric layer in the course of the record mark formation, and the record mark formed will not have a sharp edge shape to result in markedly increased jitter. In contrast, the second dielectric layer of the present invention has a thickness of up to 35 nm, and the jitter is reduced from the initial overwriting operations.

In addition, in the case of the optical recording medium sample prepared in accordance with the Example of JP-A 2-177141, the increase of jitter in repeated overwriting operations and the decrease in modulation could not be suppressed even when the thickness of the second dielectric layer was reduced. In contrast, the present invention has enabled to suppress the increase of jitter in repeated overwriting operations and the decrease in modulation by limiting the $SiO_2$ content in the dielectric layer 1b and the second dielectric layer to the range of 40 to 80 mol %. Although the reasons are yet unclear, one reason is estimated to be the heat transfer in the medium of absorption coefficient control structure. The estimated mechanism is as described below. In the medium of absorption coefficient control structure, thick reflective layer is not provided in the medium in contrast to the conventional medium, and the second dielectric layer is not readily cooled. Therefore, in the sample of the optical recording medium prepared in accordance with the Example of JP-A 2-177141, Zn and S are likely to diffuse from the dielectric layer of high ZnS content above the recording layer, and the diffusion of Zn and S into the recording layer could not be sufficiently suppressed even when the dielectric layer of high $SiO_2$ content is provided in direct contact with the recording layer. In contrast, in the present invention, the $SiO_2$ content of every part of the second dielectric layer is controlled to the range of at least 40 mol %, and the diffusion of Zn and S into the recording layer is thereby suppressed. In the present invention, the $SiO_2$ content of the dielectric layer 1b and the second dielectric layer is limited to the range of up to 80 mol % since the jitter increase and the modulation decrease could not be suppressed when the $SiO_2$ content of the region in direct contact with the recording layer is 90 mol % or higher as in the case of the Example described in JP-A 2-177141.

PREFERRED EMBODIMENTS OF THE INVENTION

Next, the present invention is described in further detail by referring to the preferred embodiments of the invention.

The optical recording medium of the present invention is a medium of absorption coefficient control structure as described above, and more illustratively, the medium which meets the conditions I and/or II as described below.

condition I: light absorption coefficient of the recording layer at wavelength of the laser beam used for recording/reproduction is such that:

$$Ac/Aa \geq 0.9$$

when light absorption coefficient in crystalline region is Ac and light absorption coefficient in noncrystalline region is Aa.

It should be noted that, in condition I, the Ac and the Aa are preferably Ac=Aa, and more preferably, Ac>Aa in consideration of the latent heat. The Ac and the Aa can be calculated from the optical constants of the layers constituting the medium and the wavelength of the recording/reproducing laser beam.

condition II: the medium has a light transmittance of at least 1% when the medium is irradiated from its rear side with a laser beam used for recording/reproduction.

It should be noted that, in condition II, the light transmittance is preferably at least 3%. The light transmittance, namely, the ratio of the transmitted light to the incident light is the value measured when the medium solely comprises the transparent substrate and the inorganic layers, for example, the value measured for the medium of FIG. 1 having no protection layer 6. Therefore, the light transmittance is the value as a result of multiple reflection between the inorganic layers, that is, the recording layer, the dielectric layers, the reflective layer, and the like. When the light transmittance is within such range, the ratio of Ac to Aa will be increased and it will be easier to bring the Ac and Aa to the more preferable relations as described above.

The light transmittance in the condition II can be measured with a spectrophotometer. The region measured is not particularly limited, and the light transmittance may be measured either for a crystalline region or for a noncrystalline region. The light transmittance, however, is generally measured for the crystalline region where no grooves are defined (mirror region).

The optical recording medium of the present invention may be of any structure as long as it satisfies the condition I and/or the condition II and has dielectric layers over and below the recording layer. The optical recording medium, however, is preferably of the structure as shown in FIG. 1.

The optical recording medium shown in FIG. 1 is a single side (single substrate) optical recording medium which has a first dielectric layer 31, a recording layer 4, a second dielectric layer 32, a reflective layer 5, and a protective layer 6 on a substrate 2 formed in this order. The present invention is applicable for a double side recording medium comprising two single side recording media which are adhered to each other by an intervening adhesive layer such that the protective layer 6 is located in the interior side of the resulting medium. The present invention is also applicable for a medium comprising the single side recording medium as described above adhered to a protective substrate by an intervening adhesive layer.

Substrate

The optical recording medium of the present invention is irradiated with the light beam from the side of the substrate 2, and therefore, the substrate 2 is preferably formed of a material substantially transparent to the light beam employed, for example, resins and glass. Typical such resins include acrylic resins, polycarbonate, epoxy resins and polyolefins. The shape and dimensions of the substrate are not critical although it is generally of disc shape having a thickness of about 0.5 to 3 mm and a diameter of about 50 to 360 mm. The substrate may be provided on its surface with a predetermined pattern of grooves for tracking and addressing purposes.

The optical recording medium of the present invention is adapted for use in high density recording, and in particular, for the system wherein both the land and the groove are used for the recording tracks (land/groove recording). In such a case, typical recording track pitch is preferably in the range of about 0.3 to 1.0 μm.

First Dielectric Layer 31 and Second Dielectric Layer 32

The first dielectric layer 31 plays the role of preventing oxidation of the recording layer and protecting the substrate by shutting off the heat which can otherwise conduct from the recording layer to the substrate upon recording. The second dielectric layer 32 plays the role of protecting the recording layer and helps the heat remaining in the recording layer after completion of recording release through heat transfer. Further, the provision of both the dielectric layers is effective for improving a degree of modulation.

The first dielectric layer 31 comprises a dielectric layer 1a on the side of the substrate 2 and a dielectric layer 1b on the side of the recording layer 4.

The dielectric layer 1a has a silicon oxide content in the range of 2 mol % to less than 40 mol % (not including 40 mol %), and preferably, 10 to 30 mol %. When the silicon oxide content of the dielectric layer 1a is too high, refractive index will be to small to realize high C/N ratio. When the silicon oxide content is too low, the number of overwritable operations will be reduced.

The dielectric layer 1b has a silicon oxide content in the range of 40 to 80 mol %, and preferably, 45 to 70 mol %. The dielectric layer 1b is provided for the purpose of suppressing the diffusion of zinc and sulfur from the dielectric layer 1a to the recording layer 4. When the silicon oxide content of the dielectric layer 1b is too low, the diffusion of zinc and sulfur will not be sufficiently suppressed, and the number of overwritable operations will be reduced. When the silicon oxide content of the dielectric layer 1b is too high, the number of overwritable operations will also be reduced.

The second dielectric layer has a silicon oxide content in the range of from 40 to 80 mol %, and preferably, 45 to 70 mol %. When the silicon oxide content of the second dielectric layer is too low, the number of overwritable operations will be reduced due to the zinc and sulfur diffusion. When the silicon oxide content is too high, the number of overwritable operations will also be reduced.

The first dielectric layer may comprise either a laminate of two or more dielectric layers each having a homogeneous composition, or a single layer of composition gradient structure in which the silicon oxide content increases incrementally or continuously from the side of the substrate 2 to the recording layer 4. When the first dielectric layer comprises a layer of composition gradient structure, the boundary between the region corresponding to the dielectric layer 1a and the region corresponding to the dielectric layer 1b is determined by the silicon oxide content as described above. The second dielectric layer may comprise either a laminate of two or more dielectric layers, or a single layer of composition gradient structure as long as the silicon oxide content is within the range as described above.

It should be noted that the above-described silicon oxide content which should be fulfilled by each of the dielectric layers should be fulfilled not only as the average of each layer, and every part of the layer should be within such range.

The content of the silicon oxide used in the present invention is the value determined by $SiO_2/(ZnS+SiO_2)$ when the zinc sulfide and the silicon oxide are calculated in terms of ZnS and $SiO_2$ respectively, that is, after determining the amount of sulfur, zinc and silicon by fluorescent X-ray analysis. It should be noted that, when excessive zinc is present in relation to sulfur, or excessive sulfur is present in relation to zinc, the excessive zinc or sulfur is assumed to be present in the form of other compounds (such as ZnO or the like) or in free form, and the smaller one of the zinc content and the sulfur content is used in the determination of the ZnS content.

The first dielectric layer 31 is preferably 30 to 300 nm thick, and more preferably, 50 to 250 nm thick. When the first dielectric layer has such thickness, the damage to the substrate upon recording can be effectively prevented and higher degree of modulation is available.

The dielectric layer 1b preferably has a thickness of 5 to 40 nm, and more preferably, 5 to 30 nm. The ratio ($t_{1b}/t_1$) of the thickness of the dielectric layer 1b ($t_{1b}$) to the thickness of the first dielectric layer ($t_1$) is preferably in the range of 0.02 to 0.5, and more preferably, 0.05 to 0.4. When the dielectric layer 1b is too thin, or the ratio $t_{1b}/t_1$ is to small, the number of overwritable operations will not be sufficiently improved. When the dielectric layer 1b is too thick, or the ratio $t_{1b}/t_1$ is too large, thickness of the dielectric layer 1a will be insufficient and a high C/N will not be realized.

The second dielectric layer 32 is preferably 10 to 35 nm thick, and more preferably, about 13 to 25 nm thick. This thickness range ensures a fast cooling rate and thus permits to define a record mark with a clear edge, resulting in reduced jitter. Also higher degree of modulation is available.

The first and the second dielectric layer may preferably contain an element whose standard free energy of sulfide formation is lower than the standard free energy of ZnS formation at 0 to 1000° C. (hereinafter referred to as metal element A). Incorporation of the metal element A in the dielectric layer results in the suppressed release of sulfur and zinc upon repeated overwriting, and increase of jitter is thereby prevented. This results in the increased number of overwritable operations.

The metal element A is preferably at least one member selected from Ce, Ca, Mg, Sr, Ba and Na, and use of Ce is most preferable in view of the low standard free energy of sulfide formation. For example, at 300 K, the standard free energy of ZnS formation is about −230 kJ/mol, the standard free energy of CeS formation is about −540 kJ/mol, the standard free energy of CaS formation is about −510 kJ/mol, the standard free energy of MgS formation is about −390 kJ/mol, the standard free energy of SrS formation is about −500 kJ/mol, the standard free energy of BaS formation is about −460 kJ/mol, and the standard free energy of $Na_2S$ formation is about −400 kJ/mol.

In the ZnS-containing dielectric layer, the ratio of the metal element A to the total metal elements is less than 2 at %, preferably 1.5 at % or less, and more preferably 1.3 at % or less. When the ratio of the metal element A is in excess of such range, the effect of suppressing jitter increase upon repeated overwriting is not realized. It should be noted that the ratio of the metal element A is preferably at least 0.01 at %, and more preferably at least 0.03 at % for sufficient realization of the metal element A addition. The ratio of the metal element A to the total metal elements may be determined by fluorescent X-ray analysis or EPMA (electron probe X-ray microanalysis). It should be noted that semimetal such as silicon is included in the "total metal elements" in the dielectric layer.

The metal element A in the dielectric layer may take form of simple substance, sulfide, oxide, fluoride, or the like.

An embodiment wherein the metal element A is added to the dielectric layer has been described in the foregoing. Alternatively, an intermediate layer containing the metal element A may be disposed between the dielectric layer and the recording layer. Examples of such intermediate layer include the layer containing cerium oxide ($CeO_2$) as simple substance, and the layer containing a mixture of ZnS—$CeO_2$ mixture.

The dielectric layers are preferably formed by vapor deposition such as sputtering and evaporation, and in particular, by sputtering. When the dielectric layer of composition gradient structure is formed by sputtering, the dielectric layer may be formed by simultaneous sputtering wherein ZnS and $SiO_2$ are used as the targets and the ratio of the power applied to each target may be incrementally or continuously altered from the initial stage to the terminal stage of the film deposition.

The metal element A may be incorporated in the dielectric layer by various methods. For example, when the metal element A is cerium, a chip comprising cerium as simple substance or $CeO_2$ may be placed on the main target comprising the main components of the dielectric layer, or alternatively, cerium may be incorporated in the main target in the form of $CeO_2$ or other Ce compounds. When calcium or magnesium is used for the metal element A, it is possible to place a chip comprising CaO or MgO. Such oxides, however, have deliquescence, and use of such chip is undesirable. In such a case, a chip comprising $CaF_2$ or $MgF_2$ may be placed on the main target. The situation is similar when strontium, barium, sodium and the like are used for the metal element A, and use of fluoride chip is more preferable than oxide chip in view of the deliquescence. Alternatively, calcium, magnesium, strontium, barium, and sodium may be incorporated in the main target in the form of oxide or other compounds. The main target may comprise a multicomponent target such as ZnS—$SiO_2$, or alternatively, ZnS and $SiO_2$ may be separately used for the main targets in simultaneous sputtering.

The ZnS-containing dielectric layer may be deposited by conventional sputtering in argon atmosphere. However, when the metal element A as described above is incorporated in the ZnS-containing dielectric layer, the sputtering is preferably effected in a mixed atmosphere of argon and oxygen. Introduction of the oxygen into the sputtering atmosphere is particularly effective when the sputtering is conducted by placing the chip comprising the metal element A as simple substance on the main target, but such oxygen introduction is also effective when the sputtering is conducted by placing the chip comprising the compound of the metal element A on the main target or by incorporating the compound of the metal element A in the main target. The amount of oxygen introduced into the sputtering atmosphere in terms of flow rate ratio $O_2/(Ar+O_2)$ is preferably 30% or less, and more preferably 25% or less. Excessive introduction of the oxygen is undesirable since the recording power decreases with no difference in the erasing power, and the erasing power margin will be extremely narrow. The oxygen is preferably introduced to a flow rate ratio of 5% or higher, and more preferably, to a flow rate ratio of 10% or higher in order to fully enjoy the effects of oxygen introduction.

Third Dielectric Layer 33

The third dielectric layer 33 is preferably formed from a material which has a refractive index higher than the protective layer 6. Although the third dielectric layer 33 is optional, by providing such third dielectric layer 33, the Ac/Aa as described above can be increased while maintaining the difference in reflectivity between the record marks and the region other than the record marks at a sufficient level as in the case of JP-A 124218/1996, supra.

The third dielectric layer 33 is preferably formed from a material containing ZnS and $SiO_2$ as its main components as in the case of the first and second dielectric layers. The third dielectric layer, however, may be formed from a material adequately selected from other oxides, nitrides, and mixtures thereof.

The third dielectric layer may preferably have a thickness of 30 to 120 nm, and more preferably 40 to 90 nm. An excessively thin third dielectric layer results in the decline of the signal output, and an excessively thick third dielectric layer results in the erasure of the signals in the adjacent track (cross erasure).

Recording Layer 4

The composition of the recording layer is not particularly limited since the merits of the present invention are realized irrespective of the composition of the recording layer as long as the recording medium is of phase change type wherein the dielectric layer is heated to an elevated temperature in the recording. However, the present invention is particularly effective when the optical recording medium has a recording layer of Ge—Sb—Te based system or In—Ag—Te—Sb based system, and in particular, Ge—Sb—Te based system.

In the recording layer of germanium (Ge)-antimony (Sb)-tellurium (Te) system, the atomic ratio of germanium, antimony and tellurium is preferably represented by the formula (I):

$$Ge_aSb_bTe_{1-a-b} \qquad (I)$$

wherein letters a and b are respectively in the range: $0.08 \leq a \leq 0.25$ and $0.20 \leq b \leq 0.40$.

If the value of a is too small in formula (I), record marks are more unlikely to crystallize and the rate of erasure would be lower. If the value of a is too large, much tellurium would bond with germanium with the resultant precipitation of antimony, inhibiting formation of record marks.

If the value of b is too small, the content of tellurium would be too much and record marks are more likely to crystallize when the medium is stored at elevated temperature with a loss of reliability. If the value of b is too large, antimony would precipitate to inhibit formation of record marks.

The recording layer of this composition system preferably has a thickness of about 12 to 50 nm. A too thin recording layer would restrain the growth of a crystalline phase and provide an insufficient change of reflectivity associated with a phase change. A too thick recording layer would provide a lower reflectivity and a lower degree of modulation.

In the recording layer of indium (In)-silver (Ag)-tellurium (Te)-antimony (Sb) system, the atomic ratio of indium, silver, tellurium, and antimony is preferably represented by the formula (II):

$$\{(In_aAg_bTe_{1-a-b})_{1-c}Sb_c\}_{1-d}M_d \qquad (II)$$

wherein letters a, b, c and d are in the range: $0.1 \leq a \leq 0.3$, $0.1 \leq b \leq 0.3$, $0.5 \leq c \leq 0.8$, and $0 \leq d \leq 0.10$, more preferably in the range: $0.11 \leq a \leq 0.28$, $0.15 \leq b \leq 0.28$, $0.55 \leq c \leq 0.78$, and $0.005 \leq d \leq 0.05$.

If the value of a is too small in formula (II), the indium content of the recording layer will be relatively too low and record marks will become less amorphous, resulting in a lower degree of modulation and lower reliability. If the value of a is too large, the indium content of the recording layer will be relatively too high and the reflectivity of regions other than record marks will become low, resulting in a lower degree of modulation.

If the value of b is too small in formula (II), the silver content of the recording layer will be relatively too low and the recrystallization of record marks and hence, repetitive overwriting will become difficult. If the value of b is too large, the silver content of the recording layer will be relatively too high and excess silver will solely diffuse into the antimony phase during the recording and erasure. This results in lower rewriting durability, less stability of both the record marks and the crystalline regions, and a loss of reliability. Specifically, when the medium is stored at elevated temperature, record marks crystallize more to invite drops of C/N and degree of modulation. Additionally, the deterioration of C/N and degree of modulation caused by repetitive recording is promoted.

If the value of a+b is too small, tellurium will become excessive to form a tellurium phase, which lowers the rate of crystal transition to hinder erasure. If the value of a+b is too large, it would become difficult to make the recording layer amorphous and it would become impossible to record signals.

If the value of c is too small in formula (II), change of reflectivity associated with a phase change will be sufficient, but erasure would be difficult due to markedly reduced rate of crystal transition. If the value of c is too large, change of reflectivity associated with a phase change will be insufficient to invite drop of degree of modulation.

The element M in formula II is at least one element selected from the group consisting of H, Si, C, V, W, Ta, Zn, Ti, Ce, Tb, Ge, Sn, Pb and Y. The element M is effective for improving rewriting durability, more specifically restraining the rate of erasure from lowering as a result of repetitive rewriting. It is also effective for improving reliability under severe conditions such as hot humid conditions. At least one of V, Ta, Ce, Ge and Y is preferred among the elements M because their effects are more outstanding. V and/or Ta is more preferred, with V being the most preferred.

If the value of d which stands for the content of element M is too large, change of reflectivity associated with a phase change becomes too small to provide a sufficient degree of modulation. If the value of d is too small, effect of the addition of the element M will be insufficient.

Although it is preferred that the recording layer consists essentially of silver (Ag), antimony (Sb), tellurium (Te), indium (In), and optionally added M, it is acceptable that the silver is partially replaced by gold (Au); the antimony is partially replaced by bismuth (Bi); the tellurium (Te) is partially replaced by selenium (Se); and the indium (In) is partially replaced by aluminum (Al) and/or phosphorus (P).

The percent replacement of Ag by Au is preferably up to 50 at %, more preferably up to 20 at %. With a higher percent replacement, record marks are likely to crystallize, leading to a loss of reliability at elevated temperature.

The percent replacement of Sb by Bi is preferably up to 50 at %, more preferably up to 20 at %. With a higher percent replacement, the recording layer would have an increased coefficient of absorption. As a result, the optical interference effect and the difference in reflectivity between crystalline and amorphous regions are reduced, leading to a lower degree of modulation and a lower C/N.

The percent replacement of Te by Se is preferably up to 50 at %, more preferably up to 20 at %. With a higher percent replacement, the crystal transition would be retarded and the rate of erasure be reduced.

The percent replacement of In by Al and/or P is preferably up to 40 at %, more preferably up to 20 at %. With a higher percent replacement, record marks would become less stable with a resultant loss of reliability. The proportion of Al and P is arbitrary.

It is noted that the recording layer of this composition system after repetitive rewriting has a coefficient of absorption k of about 3.3 in the crystalline state and about 2.2 in the microcrystalline or amorphous state.

The recording layer of this composition system preferably has a thickness of about 9.5 to 50 nm, and more preferably, a thickness of about 13 to 30 nm. A too thin recording layer would restrain the growth of a crystalline phase and provide an insufficient change of reflectivity associated with a phase change. A too thick recording layer would invite silver diffusion of an increased amount in the thickness direction of the recording layer upon formation of the recording mark which in turn results in the silver diffusion of a reduced amount in the direction of the recording layer, and the resulting recording layer would be less reliable. A too thick recording layer would also provide a lower reflectivity and a lower degree of modulation.

The composition of the recording layer is identifiable by electron probe microanalysis (EPMA), X-ray microanalysis, ICP etc.

The recording layer is preferably formed by sputtering. The conditions for the sputtering are not critical, and when a material containing two or more elements are sputtered, the sputtering may be effected by using an alloy target or by using simultaneous sputtering employing two or more targets.

Reflective Layer 5

The reflective layer 5 may comprise an extremely thin layer of a metal of high light transmission or a layer of silicon or germanium having a high transmission for the light of near infrared to infrared region including the recording/reproducing wavelength. The thickness of the reflective layer may be adequately determined to enable the absorption correction between the region other than the record marks and the record marks as described above. The range of the preferable thickness of the reflective layer significantly different by the material constituting the reflective layer, and the thickness may be determined in accordance with the material. When a metal such as Au is used for the reflective layer, the reflective layer may preferably have a thickness of up to 40 nm, and more preferably 10 to 30 nm. When Si or Ge is used for the reflective layer, the reflective layer may preferably have a thickness of up to 80 nm, and more preferably from 40 to 70 nm. A thickness below this range will invite decline of C/N, and a thickness beyond this range would provide no substantial improvement in the absorption correction effect.

When the reflective layer 5 is formed from a metal, the reflective layer may preferably comprise Au or an alloy thereof. The Au alloy may comprise the main component of and at least one alloying component selected from Al, Cr, Cu, Ge, Co, Ni, Mo, Ag, Pt, Pd, Ta, Ti, Bi and Sb.

The reflective layer 5 is preferably formed by vapor deposition such as sputtering and evaporation.

Protective Layer 6

The protective layer 6 is provided for improving scratch resistance and corrosion resistance. Preferably, the protective layer is formed of an organic material, typically a radiation curable compound or a composition thereof which is cured with radiation such as electron and UV radiation. The protective layer is generally about 0.1 to 100 μm thick and may be formed by conventional techniques such as spin coating, gravure coating, spray coating, and dipping.

Adhesive Layer

The adhesive used for the adhesive layer is not limited to any particular type, and the adhesive may be a hot melt adhesives, a UV curing adhesive, or a room temperature curing adhesive, or alternatively, a pressure sensitive adhesive.

Recording and Reproduction

The optical recording medium of the present invention may be overwritten as in the case of the conventional optical recording medium of phase change type.

In the present invention, the difference in reflectance between the record mark (noncrystalline) and the erased region (crystalline) after at least 10,000 overwriting operations is as high as at least 85% of the difference in reflectance during the initial overwriting operations, and the difference in reflectance after repeated overwriting operations can be further increased to as high as at least 90% of the difference in reflectance during the initial overwriting operations. In the present invention, "during the initial overwriting operations" designates the state after repeating at least 10 overwriting operations.

In the overwriting of the optical recording medium of the invention, the linear velocity of the recording layer in relation to the laser beam is not limited to particular range. The linear velocity, however, is generally about 0.8 to 20 m/s, and preferably 1.2 to 16 m/s when the recording layer is of the composition as described above.

In the optical recording medium having the recording layer of the composition as described above, the light used for the overwriting and reproduction may be selected from a wide range of wavelength, for example, from the range of 100 to 5,000 nm.

EXAMPLES

Examples of the present invention are given below by way of illustration and not by way of limitation.

Examples

A disc shaped substrate 2 having a diameter of 120 mm and a thickness of 0.6 mm was prepared by injection molding polycarbonate. A groove was formed in one major surface of the substrate simultaneous with the injection molding. The groove had a width of 0.60 μm, a depth of 65 nm, and a pitch of 1.20 μm. On the grooved surface of the substrate, there were formed a first dielectric layer 31, a recording layer 4, a second dielectric layer 32, a reflective layer 5, a third dielectric layer 33, and a protective layer 6 to produce the optical recording disc sample of the constitution as depicted in FIG. 1.

The dielectric layers constituting the first dielectric layer 31 and the second dielectric layer 32 were formed by sputtering in argon atmosphere by using ZnS—SiO$_2$ or SiO$_2$ for the target. The composition and the thickness of each dielectric layer are shown in Table 1. In the sample wherein the first dielectric layer is of single layer structure, the composition and the thickness of the first dielectric layer is shown in the column of the dielectric layer 1a.

The recording layer 4 was formed by sputtering in argon atmosphere. The composition and the thickness of the recording layer is shown in Table 1.

The reflective layer 5 was formed by sputtering in argon atmosphere by using Si for the target. The reflective layer 5 was formed to a thickness of 50 nm.

The third dielectric layer 33 was formed by sputtering in argon atmosphere by using ZnS—SiO$_2$ for the target. The composition and the thickness of the third dielectric layer is shown in Table 1.

The protective layer 6 was formed by applying a UV curable resin by spin coating and exposing it to UV for curing. The protective layer as cured had a thickness of 5 μm.

The thus produced samples were initialized by a bulk eraser. After the initialization, the medium from which the protective layer 6 had been removed was irradiated from the side of the substrate 2 with a laser beam at a wavelength of 638 nm to measure the light transmittance of the mirror region (crystalline region) with a spectrophotometer. The light transmittance was measured to be 5 to 10%. The samples had an Ac/Aa of 0.9 to 1.2 at a wavelength of 638 nm.

The initialized samples were evaluated for their properties in the repeated overwriting operations on an optical recording medium evaluator at a wavelength of 638 nm, NA (numerical aperture) of 0.6, and a linear velocity of 12 m/s. In the evaluation, the recording power and the erasing power were adjusted to minimize the jitter.

Difference in reflectance between the record mark and the erased region as well as the jitter were measured for each sample during initial overwriting operations (hereinafter referred to as initial) and after 10,000 overwriting operations (hereinafter referred to as after overwriting). Ratio (ΔRow/ΔRi) of the difference in reflectance (ΔRow) after repeated overwriting operations to the difference in reflectance (ΔRi) in the initial overwriting operations as well as the jitter in the initial overwriting operations and the jitter after repeated overwriting operations are shown in Table 1.

The jitter was evaluated by recording (1–7) RLL recording signals, measuring the reproduced signals with a time interval analyzer (TIA), and calculating by:

$$\sigma/Tw\ (\%),$$

wherein Tw represents window margin.

TABLE 1

| Sample No. | | First dielectric layer 1a | | Dielectric layer 1b | | Recording layer | | Second dielectric layer | | Third dielectric layer | | | Jitter (%) | |
|---|---|---|---|---|---|---|---|---|---|---|---|---|---|---|
| | | ZnS:SiO$_2$ (molar ratio) | Thickness (nm) | ZnS:SiO$_2$ (molar ratio) | Thickness (nm) | Ge:Sb:Te (atomic ratio) | Thickness (nm) | ZnS:SiO$_2$ (molar ratio) | Thickness (nm) | ZnS:SiO$_2$ (molar ratio) | Thickness (nm) | ΔRow/ΔRi | Initial | After Over-writing |
| 1 | | 85:15 | 220 | 50:50 | 20 | 2:2:5 | 16 | 50:50 | 15 | 85:15 | 60 | 1.00 | 18 | 18 |
| 2 | | 85:15 | 190 | 30:70 | 20 | 2:2:5 | 16 | 30:70 | 15 | 85:15 | 60 | 1.00 | 18 | 18 |
| 3 | (comp.) | 85:15 | 240 | — | — | 2:2:5 | 16 | 85:15* | 15 | 85:15 | 60 | 0 | 18 | — |
| 4 | (comp.) | 85:15 | 220 | 1:100* | 20 | 2:2:5 | 16 | 0:100* | 15 | 85:15 | 60 | -incapable of overwriting- | | |
| 5 | (comp.) | 85:15 | 220 | 70:30* | 20 | 2:2:5 | 16 | 70:30* | 15 | 85:15 | 60 | 0.82 | 18 | 22 |
| 6 | (comp.) | 85:15 | 220 | 50:50 | 20 | 2:2:5 | 16 | 85:15* | 15 | 85:15 | 60 | 0.80 | 18 | 23 |
| 7 | (comp.) | 85:15 | 220 | 85:15* | 20 | 2:2:5 | 16 | 50:50 | 15 | 85:15 | 60 | 0.77 | 18 | 25 |

*outside the claimed scope

The merit of the present invention is demonstrated in Table 1. In Sample Nos. 1 and 2 of the present invention, neither decrease in the reflectance difference nor increase in the jitter were noticed after repeated overwriting operations. In contrast, in Comaparative Sample No. 3 wherein the first dielectric layer is single layer structure and the first and second dielectric layers have low SiO$_2$ contents, the reflectance difference disappeared and the jitter became unmeasurable after the repeated overwriting operations. In Comaparative Sample No. 4 wherein the dielectric layers in direct contact with the recording layer comprises SiO$_2$, the medium could not be initialized with a bulk eraser. In Comaparative Sample Nos. 5 to 7 wherein SiO$_2$ content of the dielectric layer 1b and/or the second dielectric layer is excessively low, significant decrease in the reflectance difference and marked increase in the jitter were noticed after the repeated overwriting operations.

The merits of the present invention are apparent from the results as described above.

Japanese Patent Application No. 9-240514 is incorporated herein by reference.

Although some preferred embodiments have been described, many modifications and variations may be made thereto in the light of the above teachings. It is therefore to be understood that, within the scope of the appended claims, the invention may be practiced otherwise than as specifically described.

We claim:

1. An optical recording medium having a substrate and a recording layer of phase change type wherein the recording layer has a first dielectric layer and a second dielectric layer disposed on opposite sides thereof and in contact therewith, wherein condition I: light absorption coefficient of the recording layer at wavelength of the laser beam used for recording/reproduction is such that:

$$Ac/Aa \geq 0.9$$

when light absorption coefficient in crystalline region is Ac and light absorption coefficient in noncrystalline region is Aa; and/or condition II: the medium has a light transmittance of at least 1% when the medium is irradiated from its rear side with a laser beam used for recording/reproduction; is fulfilled; and difference in reflectance between the record mark and the erased region after at least 10,000 overwriting operations is at least 85% of the difference in reflectance in initial overwriting operations.

2. The optical recording medium according to claim 1 wherein a reflective layer is disposed on the second dielectric layer, and the reflective layer is the one comprising a metal with a thickness of up to 40 nm or the one comprising Si or Ge with a thickness of up to 80 nm.

3. The optical recording medium according to claim 1 wherein a third dielectric layer is disposed on the reflective layer.

4. An optical recording medium having a substrate and a recording layer of phase change type wherein the recording layer has a first dielectric layer and a second dielectric layer disposed on opposite sides thereof and in contact therewith, wherein condition I: light absorption coefficient of the recording layer at wavelength of the laser beam used for recording/reproduction is such that:

$$Ac/Aa \geq 0.9$$

when light absorption coefficient in crystalline region is Ac and light absorption coefficient in noncrystalline region is Aa; and/or condition II: the medium has a light transmittance of at least 1% when the medium is irradiated from its rear side with a laser beam used for recording/reproduction; is fulfilled;

the first dielectric layer and the second dielectric layer contains zinc sulfide and silicon oxide as their main components, and the first dielectric layer comprises a dielectric layer 1a on the side of the substrate and a dielectric layer 1b on the side of the recording layer;

the dielectric layer 1a has a silicon oxide content of from 2 mol % to less than 40 mol % (not including 40 mol %), the dielectric layer 1b has a silicon oxide content of from 40 mol % to 80 mol %, and the second dielectric layer has a silicon oxide content of from 40 mol % to 80 mol % when the silicon oxide content is determined by SiO$_2$/(ZnS+SiO$_2$) by calculating the zinc sulfide and the silicon oxide in terms of ZnS and SiO$_2$, respectively; and the second dielectric layer has a thickness of 10 to 35 nm.

5. The optical recording medium according to claim 4 wherein said dielectric layer 1b has a thickness of 5 to 40 nm, and ratio ($t_{1b}/t_1$) of the thickness of the dielectric layer 1b ($t_{1b}$) to the thickness of the first dielectric layer ($t_1$) is in the range of 0.02 to 0.5.

6. The optical recording medium according to claim 4 wherein difference in reflectance between the record mark and the erased region after at least 10,000 overwriting operations is at least 85% of the difference in reflectance in initial overwriting operations.

7. The optical recording medium according to claim 4 wherein a reflective layer is disposed on the second dielectric layer, and the reflective layer is the one comprising a metal with a thickness of up to 40 nm or the one comprising Si or Ge with a thickness of up to 80 nm.

8. The optical recording medium according to claim 4 wherein a third dielectric layer is disposed on the reflective layer.

* * * * *